United States Patent [19]
Maeda et al.

[11] Patent Number: 5,363,362
[45] Date of Patent: Nov. 8, 1994

[54] APPARATUS FOR REPRODUCING RECORDED DATA COMPRISING INTERLEAVED CLUSTERS AND CLUSTER LINKING SECTORS

[75] Inventors: Yasuaki Maeda; Ryo Ando, both of Tokyo; Hideo Obata, Kanagawa; Hideki Nagashima, Tokyo; Tadao Yoshida, Kanagawa; Kazuhiko Fujiie, Tokyo; Hirotoshi Fujisawa, Tokyo; Hiroshi Mukawa, Tokyo, all of Japan

[73] Assignee: Sony Corporation, Japan

[21] Appl. No.: 48,359

[22] Filed: Apr. 15, 1993

Related U.S. Application Data

[62] Division of Ser. No. 746,787, Jul. 16, 1991, Pat. No. 5,243,588.

[30] Foreign Application Priority Data

Aug. 24, 1990 [JP] Japan ................................ 2-22281

[51] Int. Cl.$^5$ .............................................. G11B 5/09
[52] U.S. Cl. ........................................ 369/54; 369/59; 369/60; 358/342; 360/48
[58] Field of Search ................... 369/60, 54, 58, 59, 369/48, 124, 49; 360/8, 48, 9.1, 40, 10.1, 10.3, 19.1, 35.1; 358/341, 342, 343

[56] References Cited

U.S. PATENT DOCUMENTS

| | | | |
|---|---|---|---|
| 4,733,385 | 3/1988 | Henmi et al. | 360/114 |
| 4,816,928 | 7/1989 | Sasaki et al. | 360/19.1 |
| 5,081,538 | 1/1992 | Takei et al. | 360/19.1 |
| 5,099,464 | 3/1992 | Maeda | 369/47 |
| 5,119,209 | 6/1992 | Okano | 369/10.1 |
| 5,130,816 | 7/1992 | Yoshio | 369/49 |
| 5,214,631 | 5/1993 | Maeda et al. | 369/59 |

FOREIGN PATENT DOCUMENTS

| | | |
|---|---|---|
| 0260722 | 3/1988 | European Pat. Off. |
| 0288571 | 11/1988 | European Pat. Off. |
| 0326437 | 8/1989 | European Pat. Off. |

Primary Examiner—Aristotelis Psitos
Assistant Examiner—Thang V. Tran
Attorney, Agent, or Firm—Limbach & Limbach

[57] ABSTRACT

There is provided a disc recording apparatus for recording digital data by an optical unit in such a manner that time compressed digital data are arranged into a plurality of clusters at an interval of a predetermined number of sectors, a cluster-linking sector having a length longer than an interleaving length is provided at each linking part of each cluster, and the digital data are subsequently interleaved and recorded on a disc-shaped recording medium so that interleaving at the time of data recording on the cluster-by-cluster basis is within the range of the cluster-linking sector. There is also provided a disc reproducing apparatus for reproducing digital data by an optical unit in which playback data are obtained by reproducing record data recorded on a disc-shaped recording medium in such a manner that a cluster-linking sector longer than an interleaving length is provided in a linking section of each cluster composed of a predetermined number of sectors, the resulting data is interleaved and recorded on the disc-shaped recording medium, and the playback data are deinterleaved and freed or the cluster-linking sectors so as to be stored transiently in a storage unit. Playback data are written in the storage unit when the data volume of playback data stored in the storage unit becomes smaller than a predetermined volume to maintain a readout space in the storage unit which is in excess of the predetermined data volume. In this manner, data may be read out continuously from the storage unit at a predetermined rate without interrupting the reproducing operation at the cluster-linking sector of the data recorded on the medium.

3 Claims, 7 Drawing Sheets

|← 1 BYTE →|

| OOH | FFH | FFH | FFH |
|---|---|---|---|
| FFH | FFH | FFH | FFH |
| FFH | FFH | FFH | OOH |
| MIN | SEC | BLOCK | MODE |
| D0001 | D0002 | D0003 | D0004 |
| D0005 | D0006 | D0007 | D0008 |
| D0009 | D0010 | D0011 | D0012 |
| ... | ... | ... | ... |
| D2329 | D2330 | D2331 | D2332 |
| D2333 | D2334 | D2335 | D2336 |

FIG. 3

| D0001 FILE NUMBER | D0002 CHANNEL NUMBER | D0003 SUBMODE | D0004 DATA TYPE |
|---|---|---|---|
| D0005 FILE NUMBER | D0006 CHANNEL NUMBER | D0007 SUBMODE | D0008 DATA TYPE |

FIG. 4

APPARATUS FOR REPRODUCING RECORDED DATA COMPRISING INTERLEAVED CLUSTERS AND CLUSTER LINKING SECTORS

This is a divisional of application Ser. No. 07/746,787, filed Aug.16, 1991, now U.S. Pat. No. 5,243,588.

BACKGROUND OF THE INVENTION

1. Field of the Invention

This invention relates to a disc recording apparatus and/or a disc reproducing apparatus. More particularly, it relates to a disc recording apparatus and/or a disc reproducing apparatus in which digital data are recorded and/or reproduced by optical means.

2. Description of Related Art

An optical disc may have a recording capacity larger by two or three digits than that of a magnetic disc, while enabling accessing at a higher speed than that for a tape recording medium. The optical disc also has an advantage that it enables contactless data recording/reproduction on or from the medium, and is superior in durability, so that it has become more popular in recent years. A so-called compact disc (CD) is among the widely known types of the optical discs.

Meanwhile, for providing a portable and, above all, a pocketable headphone stereo or similar recording/reproducing apparatus, with the use of the optical disc, a compact disc with a disc diameter of 12 cm and a compact, disc with a disc diameter of 8 cm (so-called cD single) have been prescribed, as long as the disc format is concerned. However, with the disc diameter of 12 cm, the recording/reproducing apparatus becomes too bulky to be portable. Therefore, a disc 8 cm or less in diameter may be thought to be convenient. However, if it is attempted to construct a portable or pocket size recording and/or reproducing apparatus with the use of an optical disc 8 cm or less in diameter, the following problem is raised.

In the case of a standard CD format, in which an optical disc, on which are recorded stereophonic digital PCM audio signals sampled with a sampling frequency of 44.1 kHz and quantized by 16 bits, is supplied by a producer, and in which these signals are exclusively reproduced by the user (CD-DA format), the playback time (recording time) of the disc which is 8 cm in diameter is 20 to 22 minutes at most, meaning that a symphony of classical music can not be recorded completely on one disc side. The playback time of 74 minutes or longer, which is approximately equal to that of the compact disc 12 cm in diameter, is desired. In addition, with this CD-DA format, recording by the user is not feasible. In addition, a contactless type optical pickup device is vulnerable to mechanical vibrations and subject to detracking or defocusing. Thus, when the apparatus is to be portable, some strong measures need to be taken to prevent adverse effects of detracking or defocusing on the reproducing operation.

On the other hand, with a CD-MO format (format employing a recordable magneto-optical disc) as an extension format of the; above mentioned standard CD format (CD-DA format) the recording/reproducing time of the disc 8 cm in diameter is only 20 to 22 minutes, as in the CD-DA format. The optical pickup device is similarly subject to detracking or defocusing of the optical pickup device due to mechanical vibrations, such that some measures need to be taken to prevent any adverse effects thereof on the recording/reproducing operation.

With the CD-I (CD-interactive) format, the levels A to C as shown in the following Table 1 are prescribed as modes for recording/reproducing bit-compressed digital audio signals.

TABLE 1

| levels | sampling frequency | number of bits for quantization | bandwidth | playback time (stereo/monaural) |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

When reproducing a disc recorded with, for example, the level B mode, signals obtained by fourfold bit compression of standard CD-DA format digital signals are reproduced. Thus, if all of the recorded data are stereophonic audio compressed data, playback time becomes fourfold, or reproduction of four-channel data, becomes feasible, so that reproduction for 70 minutes or longer becomes possible with an optical disc 8 cm in diameter or less.

Meanwhile, with the CD-I format, the disc is rotationally driven at the same linear velocity as that for the standard CD-DA format, so that the continuous audio compressed data are reproduced at a rate of one unit to n recorded units on the disc where n is a figure corresponding to the playback time or the bit compression rate of data and is equal to 4 (n=4) with the level B stereo mode. This unit is termed a block or sector which is made up of 98 frames and has a period of 1/75 second. Therefore, with this level B stereo mode, a data string in which one of four sectors is an audio sector, such as

S D D D S D D D ...

where s is an audio sector and D is other data sector or sectors is recorded on the sector-by-sector basis on the disc. However, for actual recording, since the above data string undergoes a predetermined encoding similar to that for ordinary CD format audio data, such as error correction coding and interleaving, data of the audio sector S and data of the data sector D are arranged in a scrambled fashion in the recording sectors on the disc. The other data sectors D may for example be video or computer data. When the bit-compressed audio signals are also used for the data sector D, a data string in which four-channel audio sectors S1 to S4 are cyclically arranged, that is a data string

S1 S2 S3 S4 S1 S2 S3 S4 ...

is encoded and recorded on the disc. When recording and reproducing continuous audio signals, the above mentioned four-channel audio signals are linked sequentially beginning at the first channel and terminating at the fourth terminal. More specifically, channel 1 data corresponding to the audio sector S1 are reproduced from the innermost to the outermost sides of the disc. Channel 2 data corresponding to the audio sector 52 are reproduced from the innermost to the outermost sides of the disc. Channel 3 data corresponding to the next audio sector S3 are reproduced from the innermost to the outermost sides of disc. Finally, channel 4 data corresponding to the audio sector S4 are reproduced from the innermost to the outermost sides of the disc to enable data reproduction for a continuous fourfold time duration.

However, for the above mentioned continuous reproduction, several track jump operations for a longer distance spanning the inner and outer disc peripheries are necessitated. Since the track jump can not be achieved instantaneously, playback data become depleted for a short time period, meaning that the playback sound is momentarily interrupted. On the other hand, when continuous audio signals are to be recorded, it is not possible to record only the sector 2 signals, as an example, because the data need to undergo interleaving at the time of recording. That is, sector 2 data need to be interleaved with adjoining and even nearby sectors, such as sectors S1 and S3, such that it becomes necessary to rewrite signals of previously recorded sectors. Thus it is extremely difficult to record the continuous compressed audio data.

Besides, it is desirable if switching selection may be made between the above mentioned plural compression modes, because then the usage of the recording/reproducing apparatus may be enlarged significantly. However, if it is necessary to change the rotational velocity of the disc the recording pattern or the signal processing operation for each of the compression modes selected by switching selection, the circuitry becomes complex to render it difficult to supply an inexpensive apparatus. It is therefore preferred that changes brought about in control operations, recording patterns of signal processing operations as a result of the different compression modes be as little as possible.

OBJECTS AND SUMMARY OF THE INVENTION

It is a principal object of the present invention to provide a disc recording and/or reproducing apparatus in which continuous recording and continuous reproduction for a sufficiently long time is possible even with the use of a small-sized disc.

It is another object of the present invention to provide a disc recording and/or reproducing apparatus in which processing complexity due to interleaving at the time of recording compressed audio data on the disc may be avoided.

It is a further object of the present invention to provide a disc recording and/of reproducing apparatus in which changes in the control or signal processing operations brought about as a result of switching selection between a plurality of compression modes may be minimized.

The present invention provides a disc recording apparatus for recording compressed digital data on a disc-shaped recording medium comprising storage means for transiently storing the digital data, and means for arranging said digital data read out from said storage means into a plurality of clusters at an interval of a predetermined number of sectors, annexing cluster-linking sectors at linking portions of each of said clusters, each of said cluster-linking sectors being longer than an interleaving length for said digital data, subsequently processing the digital data within each of said clusters by interleaving and recording interleaved data on said disc-shaped recording medium.

The present invention also provides a disc reproducing apparatus comprising reproducing means for reproducing a disc-shaped recording medium on which are recorded compressed digital data arranged into a plurality of clusters at an interval of a predetermined number of sectors, provided with cluster-linking sectors each longer than an interleaving length at linking portions of each of said clusters and subsequently interleaved, storage means for transiently storing playback data from said reproducing means, and control means causing said playback data to be written when the data volume of said playback data stored in said storage means is lesser than a predetermined volume that a readout space in excess of a predetermined data volume is maintained in said storage means.

The storage changes means minimize changes in the recording/reproducing operation due to the difference in the compression modes, while absorbing fluctuations in the recording/reproducing operation caused by mechanical vibrations. During recording, record data are written in said storage means at a data transfer rate conforming to the prevailing compression modes and are read out intermittently, that is, in a burst fashion, at a predetermined standard data transfer rate, so as to be recorded on the disc-shaped recording medium. During reproduction, data are reproduced intermittently, that is in a burst fashion, from the disc-shaped recording medium at the predetermined standard data transfer rate and are written on said storage means so as to be read out at a data transfer rate conforming to the prevailing compression mode.

Recording on the disc-shaped recording medium is made on the cluster-by-cluster basis. Since a cluster-linking sector longer than an interleaving length is provided between adjoining clusters, recording may be made so as to be inclusive of the cluster-linking sectors to eliminate the effects of interleaving on neighboring clusters.

With the use of the clusters and cluster-linking sectors as a recording unit, recording may be performed independently on the cluster-by cluster basis, without the necessity of taking the effects of interleaving on other clusters into account, so that processing as well as re-recording in the case of a recording failure may be facilitated.

For reproduction, dropout of playback data by the cluster-linking sectors may be buffered by provision of a memory means adapted for transient storage of playback data so as to enable continuous playback data to be obtained from the memory means.

It is noted that the present invention may be preferably applied to an apparatus for recording and/or reproducing bit compressed data (time compressed data).

BRIEF DESCRIPTION OF THE DRAWINGS

FIG. 3 shows an example of a data construction of one sector or block.

FIG. 4 shows the contents of a subheader.

DETAILED DESCRIPTION OF PREFERRED EMBODIMENT

Figure 1:
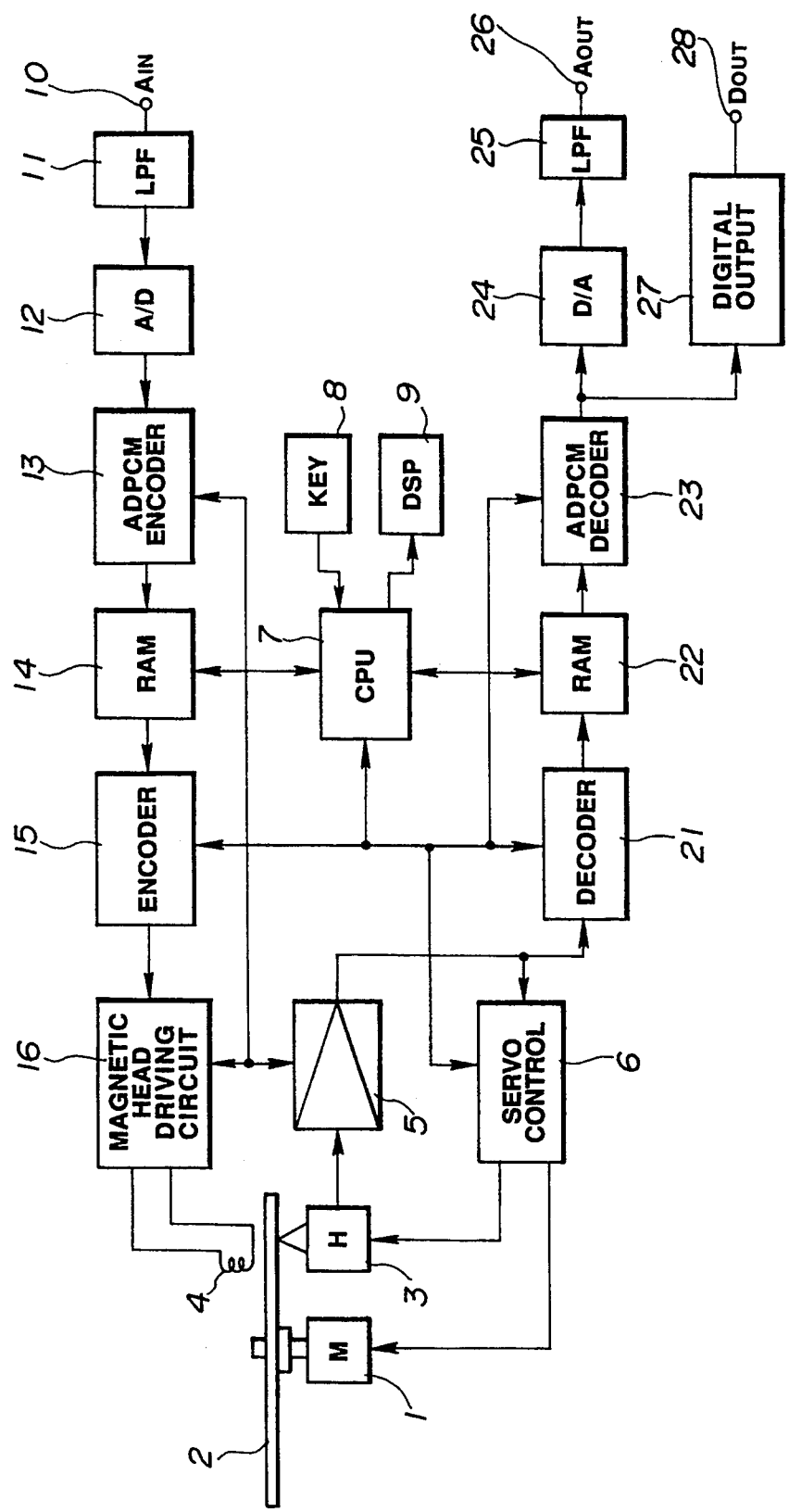
FIG. 1 is a block diagram showing a construction of a disc recording/reproducing apparatus according to the present invention.

FIG. 1 is a block circuit diagram showing a schematic construction of an optical disc recording/reproducing apparatus according to an embodiment of the present invention.

In the disc recording/reproducing apparatus, a magneto-optical disc 2 rotationally driven by a spindle motor 1 is employed as a recording medium. While a laser light is irradiated by an optical head 3 on the magneto-optical disc 2, a modulating magnetic field consistent with recording data is applied by a magnetic head 4 to the magneto-optical disc 2 for recording data along a recording track of the disc 2. On the other hand, the recording track of the magneto-optical disc 2 is traced with a laser light by the optical head 3 for photomagnetically reproducing the recorded data.

The optical head 3 is constituted by a laser light source, such as a laser diode, optical components, such as a collimator lens, an object lens, a polarization beam splitter or a cylindrical lens, and a split photodetector, although these device are not shown, and is arranged for facing the magnetic head 4 with the magneto-optical disc 2 in-between. For recording data on the magneto-optical disc 2, the optical head 3 irradiates a laser light on a target track on the magneto-optical disc 2 for recording data by thermomagnetic recording. The modulating magnetic field consistent with the recording data is applied to the target track by the magnetic head 4 which is driven by a head driving circuit 16 of the recording system which will be explained subsequently. The optical head 3 detects a laser light irradiated on and reflected by the target track for detecting the focusing error by a so-called astigmatic method as well as detecting the tracking error by a so-called push-pull method. When reproducing data from the magneto-optical disc 2, the optical head 3 detects the difference of a polarization angle (Kerr rotation angle) of the reflected laser light from the target track to produce playback signals.

The output of the optical head 3 is supplied to an RF circuit 5. The RF circuit 5 extracts the focusing error signal and the tracking error signal from the output of the optical head 3 and transmits the extracted signals to a servo control circuit 6 while converting the reproduced signals into corresponding binary signals and supplying the binary signals to a decoder 21 of the reproducing system, which will be explained subsequently.

The servo control circuit 6 is constituted by a focusing servo circuit, a tracking servo circuit, a spindle motor servo control circuit and a thread servo control circuit, although these circuits are not shown. The focusing servo control circuit executes focusing control of an optical system of the optical head 3 so that the focusing error signal will be reduced to zero. The tracking servo control circuit executes tracking control of the optical system of the optical head 3 so that the tracking error signal will be reduced to zero. The spindle motor servo control circuit controls the spindle motor 1 for rotationally driving the magneto-optical disc 2 at a predetermined rotational velocity, such as at a constant linear velocity. The thread servo control circuit causes the optical head 3 and the magnetic head 4 to be moved to a target track position on the magneto-optical disc 2 designated by the system controller 7. The servo control circuit 6, which performs these various control operations, transmits an information indicating operating states of components controlled by the servo control circuit 6 to the system controller 7.

To the system control let 7 are connected a key input operating section 8 and a display section 9. This system controller 7 controls the recording system and the reproducing system with the operating mode designated by an operating input information from the key input operating section 8. The system controller 7 supervises, on the basis of a sector-by-sector address information reproduced from the recording track of the magneto-optical disc 2 by the header time or sub-Q data, the recording position as well as the reproducing position on the recording track traced by the optical head 3 and the magnetic head 4. The system controller 7 causes a bit compression mode to be displayed on a display section 9 on the basis of bit compression mode data in the reproduced data obtained from the RF circuit 5 by means of a reproducing system as later described, or of bit compression mode data in the ADPCM encoder 13 switchingly selected by the key input operating section 8. The system controller also causes the playback time to be displayed on the display section 9 on the basis of a data compression ratio and the reproducing position data on the recording track in the bit compression mode.

For displaying the playback time, the sector-by-sector address information (absolute time information), reproduced from the recording track of the magneto-optical disc 2 with the head time or sub-Q data, is multiplied by a reciprocal of the data compression ratio in the bit compression mode (four in case of ¼ compression) to find an actual time information for display on the display section 9. It is noted that, if an absolute time information has been recorded (preformatted) on a recording track of a magneto-optical disc, the preformatted absolute time information may be read during recording and multiplied by the reciprocal of the data compression ratio to cause display of the current position in the form of the actual recording time.

It is noted that the recording system of the disc recording/reproducing apparatus is provided with an A/D converter 12 to which an analog audio signal $A_{IN}$ is supplied from an input terminal 10 by way of a low-pass filter 11.

The A/D converter 12 quantizes the audio signal $A_{IN}$. The digital audio data obtained at the A/D converter 12 is transmitted to an adaptive differential pulse code modulating encoder (ADPCM encoder) 13. The ADPCM encoder 13 processes the standard transfer rate digital audio data quantized from the audio signal $A_{IN}$ by the ADPCM encoder 13 by a data compressing operation in conformity to the various modes in the CD-I system shown in Table I, and has its operating mode designated by the system controller 7. For example, in the B-level mode of Table 1, the digital audio data are processed into compressed data (ADPCM audio data) having a sampling frequency of 37.8 kHz and the number of bits per sample equal to 4 before being supplied to a memory 14. The data transfer rate with the B-level stereo mode is reduced to one-fourth of the standard data transfer rate of 75 sectors/second, or 18.75 sectors/second.

In the embodiment of FIG. 1, it is assumed that the sampling frequency of the A/D converter 12 is fixed at the sampling frequency of the standard CD-DA format, or 44.1 kHz, and that, in the ADPCM encoder 13, bit compression from 16 bits to 4 bits is performed after conversion of the sampling rate in conformity to the compression mode, for example, from 44.1 kHz to 37.8 kHz for level B. Alternatively, the sampling frequency of the A/D converter 12 itself may be switchingly controlled as a function of the compression modes. In this case, the cut-off frequency of the low-pass filter 11 is also switchingly controlled as a function of the switchingly controlled sampling frequencies of the A/D converter 12. That is, the sampling frequency of the A/D converter 12 and the cut-off frequency of the low-pass filter 11 may be simultaneously control led in dependence upon the compression modes.

The memory 14 is used as a buffer memory in which data Writing and readout are control led by the system controller 7 and which transiently stores ADPCH audio data supplied from the ADPCM encoder 13 for recording on the disc as the occasion may demand. That is, in the B-level stereo mode, the compressed audio data supplied from the ADPCM encoder 13 has its transfer rate reduced to one-fourth of the standard data transfer rate of 75 sectors/second, of to 18.75 sectors/second, these compressed data being continuously written in the memory 14. Although it suffices to record the compressed data (ADPCM data) at a rate of every four sectors, as explained hereinabove, it is practically impossible to record the data at this fate in view of the interleaving operation, and hence the sectors are recorded continuously as later explained. Such recording is performed in a burst fashion (discontinuously) at a standard data transfer rate of 75 sectors/second, by taking advantage of a quiescent period of the time-compressed data, with a cluster, composed of a predetermined number of, e.g. 32 plus a few sectors, as a recording unit. That is, in the memory 14, the B-level stereo mode ADPCM audio data, which has been continuously written as she lower transfer rate of 18.75 (=75/4) sectors/second conforming to the data compression ratio, is read out as record data in a burst fashion at the above mentioned transfer rate of 75 sectors/second. The overall data transfer rate of the data read out and recorded in this way, inclusive of the non-recording period, is a lower rate of 18.75 sectors/second. However, an instantaneous data transfer rate within the time of the burst-like recording operation is equal to the above mentioned standard rate of 75 sectors/second. Therefore, if the rotational velocity of the disc is the same as that of the standard CD-DA format, that is, a constant linear velocity, recording is made at the same recording density and with the same recording pattern as those of the CD-DA format.

The ADPCM audio data read out from memory 14 in a burst fashion at the transfer rate of 75 sectors/second, that is, the record data, is supplied to an encoder 15. With a data string supplied from memory 14 to encoder 15, a data unit continuously recorded with each recording is composed of a plurality of, e.g. 32 sectors, and a few cluster-linking sectors arrayed before and after the cluster. The cluster-linking sector has a length longer than the interleaving length at the encoder 15 so that, even when the sector undergoes interleaving, data of other clusters remain unaffected. Details of the recording on the cluster-by-cluster basis will be discussed later by referring to FIG. 2.

The encoder 15 processes the record data supplied in a burst fashion from the memory 14 with an error correcting coding operation, such as by parity addition or interleaving, or eight-to-fourteen modulation (EFM). The recording data, thus encoded by the encoder 15, is supplied to the magnetic head driving circuit 16.

To the magnetic head driving circuit 16 is connected the magnetic head 4 which drives the magnetic head 4 to apply a modulating magnetic field conforming to the record data to the magneto-optical disc 2.

On the other hand, the system controller 7 performs writing and readout control for the memory 14 and, based on the memory control, performs a disc recording position control so that the above mentioned record data read out in a burst fashion of memory 14 will be recorded continuously on the recording track of the magneto-optical disc 2. For the recording position control, the record position on the disc of the record data read out in a burst fashion from the memory 14 is supervised by the system controller 7, and control signals designating the record position on the recording track of the magneto-optical disc 2 are supplied to the servo control circuit 6.

The reproducing system in the disc recording/reproducing apparatus is hereinafter explained.

The reproducing system is adapted for reproducing the record data continuously recorded by the above described recording system on the recording track of the magneto-optical disc 2, and is provided with a decoder 21, to which is supplied a playback output, which has been generated by the optical head 3 tracing the recording track on the magneto-optical disc 3 with a laser light and converted into binary format signals by the RF circuit 5.

The decoder 21 is associated with the encoder 15 in the above described recording system, and processes the playback output, converted into the binary format signals by the RF circuit 5, with the above mentioned decoding for error correction and EFM decoding, and reproduces the above mentioned B level stereo mode ADPCM audio data at a transfer rate of 75 sectors/second which is faster than the normal transfer rate in the above mentioned B level stereo mode. The reproduced data, produced by the decoder 21, is supplied to a memory 22.

The memory 22 has its data writing and readout controlled by the system controller 7 so that the playback data supplied from decoder 21 at a transfer rate of 75 sectors/second sequentially written at the transfer rate of 75 sectors/second. Also the playback data intermittently written at the transfer rate of 75 sectors/second in the memory 22 are continuously read out there from at the regular B-level stereo mode of 18.75 sectors/second.

The system controller 7 also performs a memory control of writing the reproduced data in the memory 22 at the transfer rate of 75 sectors/second, continuously reading out the playback data from the memory 22 at the transfer rate of 18.75 sectors/second and stopping writing to prevent over flow of data stored in the memory 22.

The system control let 7 performs, besides the above mentioned writing and readout control for memory 22, a reproducing position control for the recording track of the magneto-optical disc 2, in such a manner that the playback data written by the above mentioned memory control in the memory 22 is written therein continuously. The reproducing position control is performed by supervising a reproducing position on the disc of the above mentioned playback data read out in a burst fashion from the memory 22 by system control let 7 and by supplying a control signal designating the reproducing position on the recording track of the magneto-optical disc 2 to the servo control circuit 6.

The B-level stereo mode ADPCM audio data, obtained as playback data read out continuously from memory 22 at a transfer rate of 18.75 sectors/second, are supplied to the ADPCM decoder 23.

This ADPCM decoder 23 is associated with the ADPCM encoder 13 of the recording system. The decoder 23 has its operating mode designated by system controller 7. With the present disc recording/reproducing apparatus, the B-level stereo mode ADPCM audio data are expanded by a factor of four for reproducing the CD-DA mode digital audio data. The reproduced digital audio data is transmitted by the ADPCM decoder 23 to a D/A converter 24.

The D/A converter 24 causes the digital audio data supplied from the ADPCM decoder 23 to be converted into an analog audio signal $A_{OUT}$. The analog audio signal $A_{OUT}$, obtained at the D/A converter 24, is outputted via a low-pass filter 25 at an output terminal 26.

The reproducing system of the disc recording/reproducing apparatus of the present embodiment is provided with a digital outputting function so that the digital audio data at the output of the ADPCM decoder 23 is outputted at a data output terminal 28 via a digital output encoder 27 as a digital audio signal $D_{OUT}$.

Meanwhile, the magneto-optical disc 2 employed in the above described disc recording/reproducing apparatus preferably has a recording space of longer than 60 minutes and up to about 74 minutes for stereo audio signals. With the data compression rate of ¼ as in the above mentioned B level mode, the recording capacity of approximately 130M bytes is necessary. For a portable or pocketable size of the recording and/of reproducing apparatus, it is preferred to use a disc outside diameter of 8 cm or less. In addition, a track pitch of 1.6 μm and a linear velocity of 1.2 to 1.4 m/second, similar to those of a compact disc, are preferred. For satisfying these conditions, the disc outside diameter may be 64 mm, the inside diameter of a data recording region may be 61 mm, the inside diameter of the data recording region may be 32 mm, the inside diameter of the lead-in region may be 30 mm and a center hole diameter may be 10 mm. By having the disc accommodated in a disc caddy of 70×74 mm is size and presented to the market in this state, it becomes possible to record and reproduce the disc by a pocket size recording/reproducing apparatus. The inside and outside diameters of the disc recording region for enabling recording and/or reproduction for 72 to 76 minutes with the above mentioned ¼ data compression mode may be suitably selected within the range of the outside diameter of 60 to 62 mm for the inside diameter of 32 mm and within the range of the outside diameter of 71 to 73 mm for the inside diameter of 50 mm.

The recording/reproducing operation by the above described disc recording/reproducing apparatus will be explained in more detail.

The record data, that is data read out from the memory 14, is arranged into a cluster at an interval of a predetermined number of, e.g. 32, sectors or blocks, and several cluster-linking sectors are arrayed between adjoining clusters. In more detail, each cluster C consists of 32 sectors or blocks B0 to B31, and five linking sectors L1 to L5 are arranged between these clusters C for linking the adjoining clusters. For recording a cluster, such as a k'th cluster $C_k$, the 32 sectors B0 to B31 of the cluster $C_k$ and the linking clusters ahead and at the back of the cluster $C_k$, namely the three sectors L3 to L5 towards the cluster $C_{k-1}$ (run-in blocks) and the three blocks L1 to L3 towards the cluster $c_{k+1}$, making a total of 38 sectors, are recorded as one unit. The 38-sector record data are transmitted from the memory 14 to the encoder 15 where interleaving is carried out from data rearrangement over a distance of up to 108 frames corresponding to ca. 1.1 sector. However, even after interleaving, the data within the cluster $c_k$ are safely contained within a range of from the run-in blocks L3 to L5 to the run-out blocks L1 to L3 without affecting the remaining clusters $c_{k-1}$ of $c_{k+1}$. Meanwhile, dummy data, such as 0, are arrayed in the linking sectors L1 to L5 to avoid adverse effects which interleaving might have on the data per se. When recording the next cluster $c_{k+1}$, three sectors L3 to L5 of the five linking sectors L1 to L5 between the current cluster and the next cluster $c_{k+1}$ are used as the run-in blocks, so that the sector L3 is recorded superfluously. However, this causes no inconvenience: The sector L3 of the run-in block or the sector L3 of the run-out block may be omitted.

By recording on the cluster-by-cluster basis, there is no necessity of taking an interference with the adjoining clusters by interleaving into account, so that data processing may be simplified significantly. On the other hand, if the record data should be unable to be recorded normally due to malfunctions, such as defocusing, detracking, etc., re-recording may be made on the cluster-by-cluster basis and, of the record data should be unable to be reproduced effectively, re-reading may be made on the cluster-by-cluster basis.

Meanwhile, each sector or block consists of 12 synchronizing bits, 4 header bytes and 2336 bytes of data per se D0001 to D2336, arrayed in this order on the time axis, making a total of 2352 bytes. This sector or block array is represented as a two-dimensional array, as shown in FIG. 3, wherein the 12 synchronization bits consist of a first byte OOH, ten bytes FFH and a last byte OOH in the hexadecimal system (H is a hexadecimal number). The next 4 -byte, header consists of address parts for minute, second and block, each one byte, and a mode data byte. These mode data mainly indicate a CD-ROM mode, while a sector structure shown in FIGS. 2 or 3 corresponds to the mode 2 of the CD-ROM format. The CD is a standard employing the mode 2 and the contents of the data D0001 to D0001 are prescribed as shown in FIG. 4.

Figure 2:
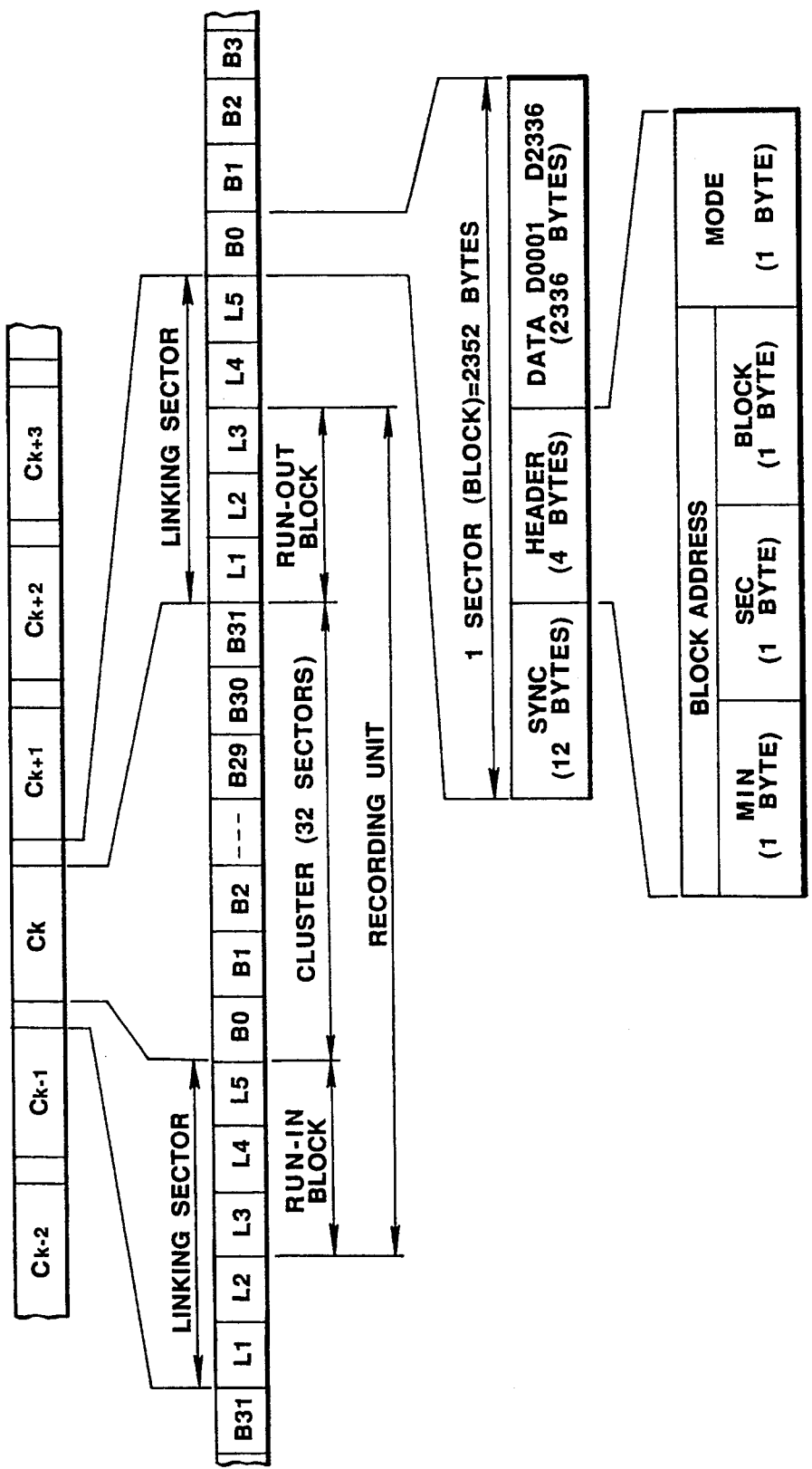
FIG. 2 shows a format of a cluster as a recording unit.
Figure 5:
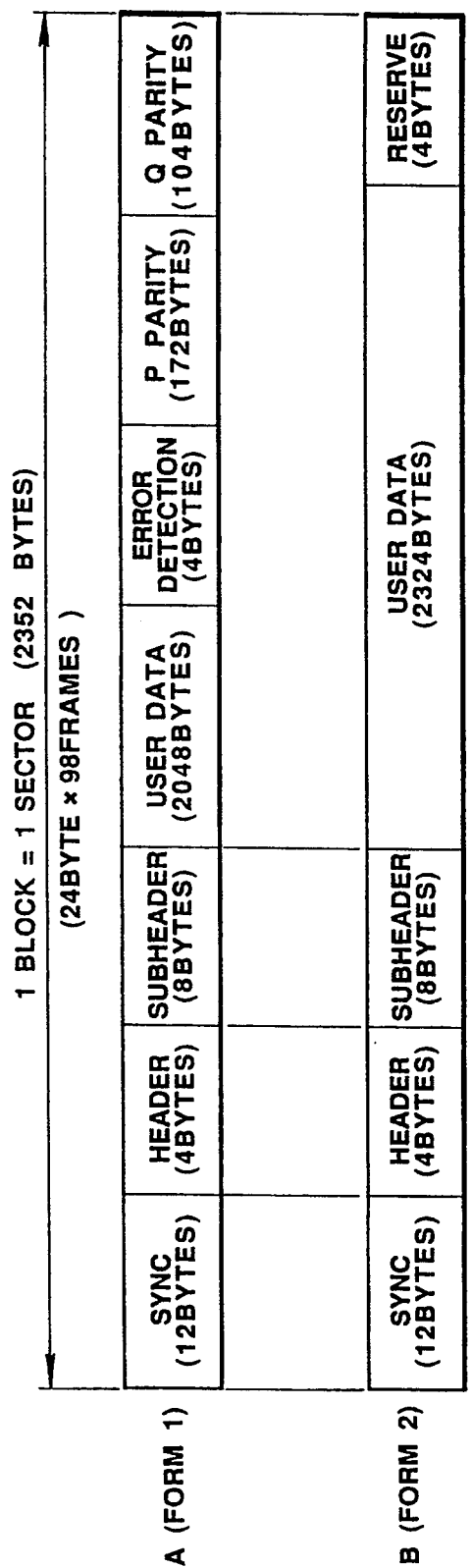
FIG. 5 shows a data arrangement in one sector of the CD-I format.

FIG. 5 shows forms 1 and 2 of the CD-I standard, which 12 synchronizing bits and 4 header bytes are the same as those of the CD-ROH mode 2 shown in FIGS. 2 and 3. The next 8 subheader bytes are prescribed as shown in FIG. 4 wherein data D0001 and P0005 are File numbers, data D0002 and D0006 are channel numbers, data D0003 and D0007 are submode data and data D0004 and D0008 are data type data. The data D0001 to D0004 and data D0005 to D0008 are the same data written in duplicates. The next 2328 bytes consist of 2048 user data bytes. A error-detecting bytes, 172 P parity bytes and 104 Q parity bytes, for from 1 of FIG. 5A. This form L is used for recording letter data, binary data and high compression video data. The 2328 bytes for form 2 of FIG. 5B consist of 2324 user data bytes downstream of the sub-header data, and the remaining 4 reserve data bytes. This form 2 is used for recording compressed audio data or video data. In the case of the compressed audio data, 18 128-byte sound groups (2304 bytes) are arrayed in the 2324 user data bytes, with the remaining 20 bytes representing a vacant space.

Figure 6:
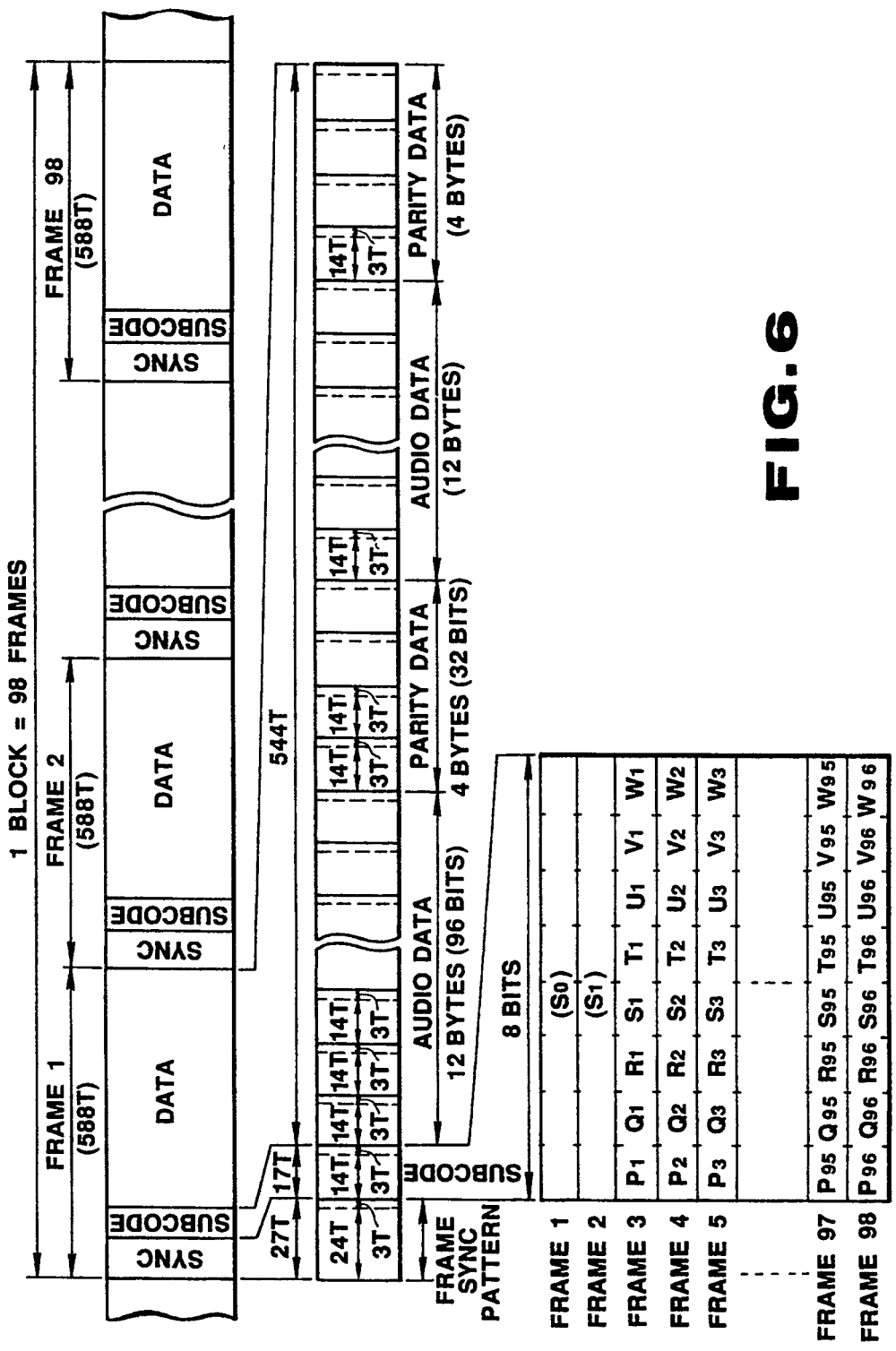
FIG. 6 shows a format for a frame and a block (sector) in the so-called CD standard.
Figure 7:
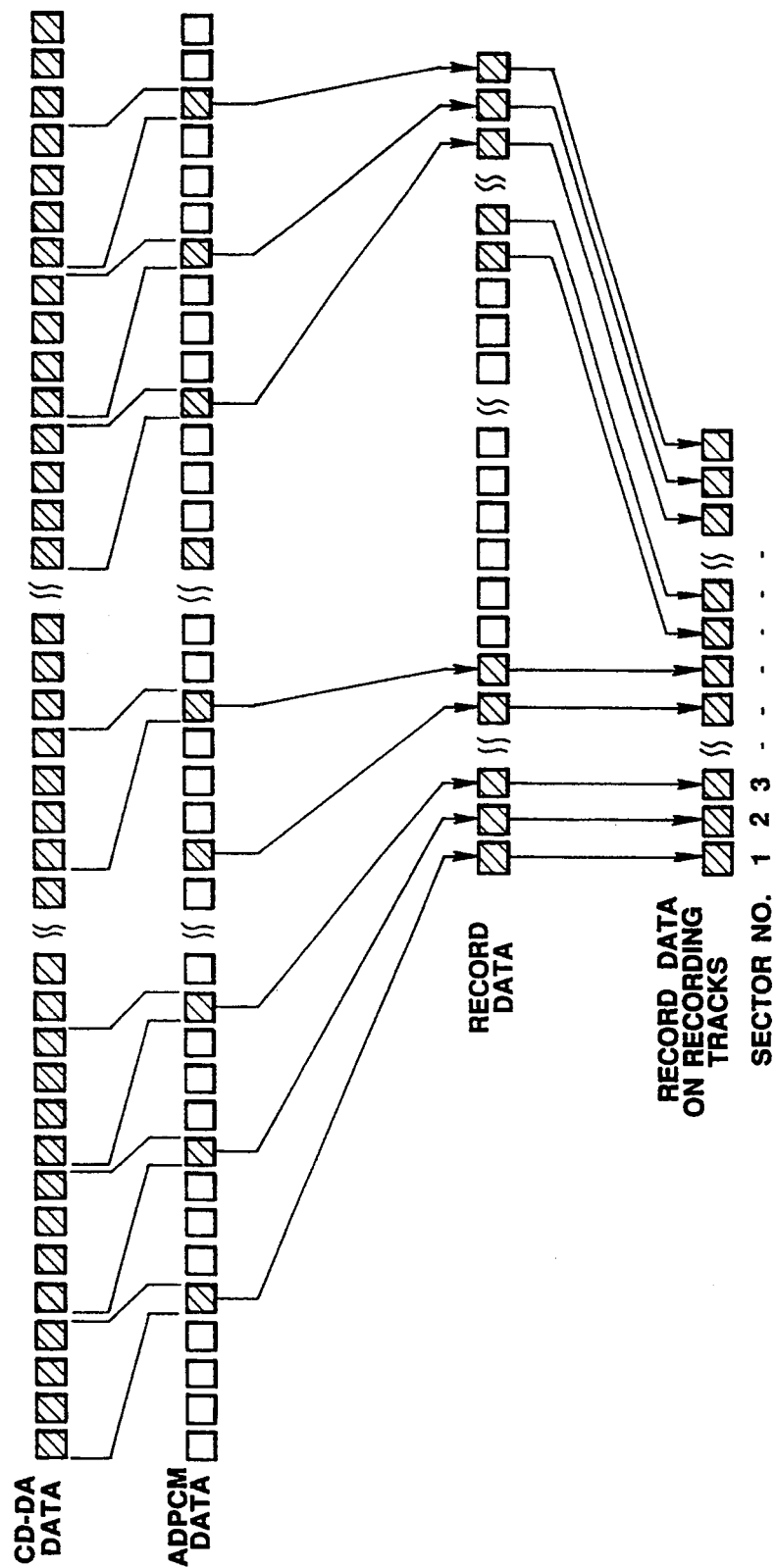
FIG. 7 shows a data format employed in the ,disc recording/reproducing apparatus.

Meanwhile, when recording the above-described sector-based data on a disc, a coding operation such as parity addition or interleaving of EFM encoding is carried out by the encoder 15, so that recording is performed with a recording format shown in FIG. 6.

Referring to FIG. 6, each block of sector consists of 98 frames of 1st to 98th frames, with each frame being 588 times a channel clock period T(588T). Within each frame, there are a frame synchronizing pattern part of 24T (plus 3T for linking), a subcode part of 14T (plus 3T for linking) and data part of 544T (for audio data and parity data). The 544 T data part consists of 12 bytes of symbols of audio data, 4 bytes of parity data, 12 bytes of audio data and 4 bytes of parity data which have been processed by EFM (eight-to-Fourteen modulation). Audio data in each frame is constituted by 24 bytes or 12 words because each word of the audio sample data consists of 16 bits. The subcode part is the 8-bit subcode data which has undergone EFM and is arrayed in a block with 98 frames as a unit, each bit constituting one of eight subcode channels P to W. The subcode parts of the first and second frames are block synch patterns $S_0$ and $S_1$ which violate the EFM rule, each of the subcode channel P to W being constituted by 96 bits for the third to 98 the frames.

The above mentioned audio data, recorded after interleaving, are deinterleaved during reproduction into audio data of a data array conforming to the regular time sequence. The CD-I data, such as are shown in FIGS. 3 and 5, may be recorded in place of the audio data.

Meanwhile, digital data obtained at the A/D converter 12 in the disc recording/reproducing apparatus shown in FIG. 1 , are data similar to those of the CD-DA format, that is the audio PCM data with the sampling frequency of 44.1 kHz, the number of quantization bits equal to 16 and a data transfer rate of 75 sectors/second. When the data is transmitted to the ADPCM encoder 13 so as to be bit-compressed to the above-mentioned stereo mode, the digital data are converted into data with a sampling frequency of 37.8 kHz and the number of quantization bits is compressed to four bits. Thus the output data are the ADPCM audio data having the data transfer rate reduced by $\frac{1}{4}$, or to 18.75 sectors/second. The B level stereo mode ADPCM audio data, continuously outputted at a transfer rate of 18.75 sectors/second from the ADPCM encoder 13, are supplied to the memory 14.

Figure 8:
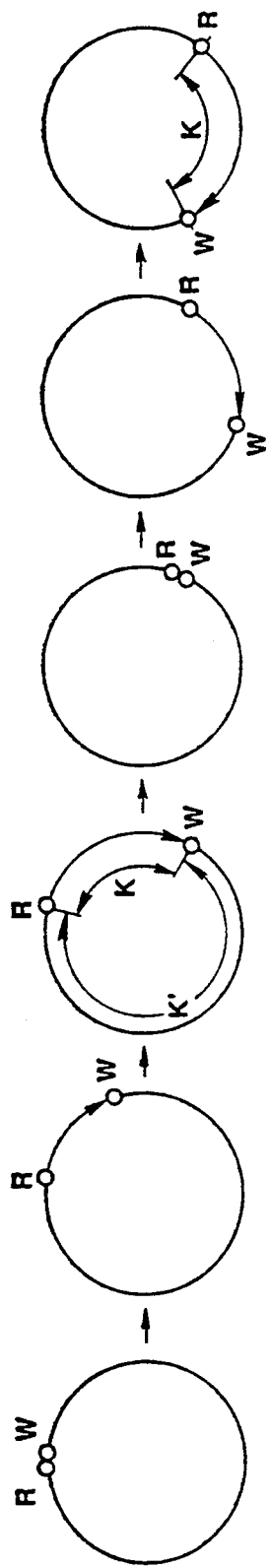
FIG. 8 shows the state of a memory-controlled memory in a recording system of the disc recording/reproducing apparatus shown in FIG. 1.

Referring to FIG. 8, the system controller 7 controls the memory 14 in such a manner that a write pointer W of the memory 14 is continuously incremented at a transfer rate of 18.75 sectors/second to continuously write the ADPCM audio data in the memory 14 at a transfer rate of 18.75 sectors/second and, when the data volume of the ADPCM audio data stored in the memory 14 exceeds a predetermined volume, a read pointer R of the memory 14 is intermittently incremented in a burst fashion at the transfer rate of 75 sectors/second to read out a predetermined amount K of the ADPCM data in a burst fashion from the memory 14 as record data at the above mentioned transfer rate of 75 sectors/second.

That is, in the recording system of the disc recording-/reproducing apparatus shown in FIG. 1, the ADPCM audio data continuously outputted at the transfer rate of e.g. 18.75 sectors per second from the ADPCM encoder 13 are written in the memory 14 at the above mentioned transfer rate of 18.75 sectors/second. When the data volume of the ADPCM data stored in the memory 14 exceeds a data volume corresponding to one cluster, one-cluster, data of the ADPCM audio data is read out from memory 14 at the transfer rate of 75 sectors/second as record data, so that input data can be continuously written in the memory 14 while a data write region K' in excess of a predetermined volume is perpetually assured within the memory 14. By recording the recording position on the recording track of the magneto-optical disc 2 under control by the system controller 7, the record data read out in a burst fashion from the memory 14 can be recorded consecutively on the recording track on the magneto-optical disc 2. Since a data write region in excess of a predetermined volume is maintained in the memory 14, data can be continuously written in the data writing region in excess of the predetermined volume even of the system controller 7 detects that a track ,jump etc. has occurred due to disturbances or the like to interrupt a recording operation on the magneto-optical disc 2, and the reset operation may be carried out in the interim. Thus, input data can be continuously recorded without dropout on the recording track of the magneto-optical disc 2.

Meanwhile, header time data corresponding to the physical address of the sectors are annexed to the ADPCM audio data on the sector-by-sector basis, and recorded on the sector-by-sector basis on the magneto-optical disc 2. Table of contents indicating the record region and the recording mode are recorded in a table-of-contents region.

Figure 9:
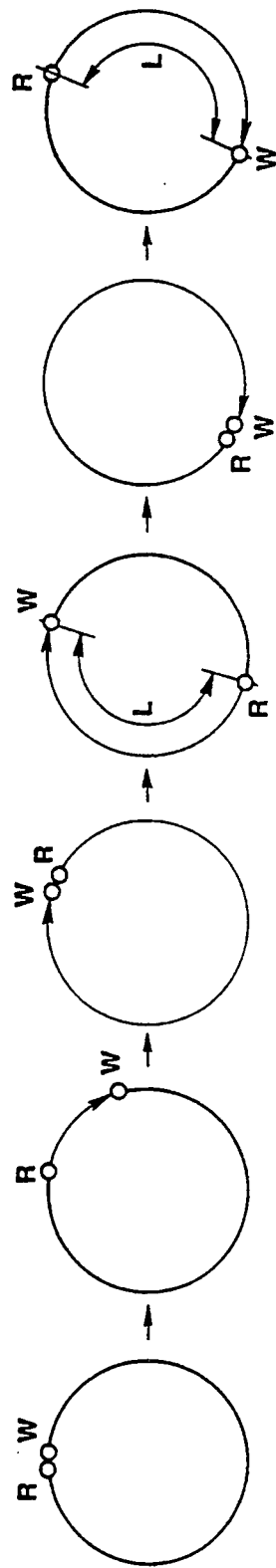
FIG. 9 shows the state of a memory-controlled memory in a reproducing system of the disc recording/reproducing apparatus shown in FIG. 1.

In the reproducing system of the disc recording/reproducing apparatus shown in FIG. 1, the system controller 7 controls the memory 22 in such a manner that, as shown in FIG. 9, the write pointer W of the memory 22 is incremented at a transfer rate of 75 sectors/second to write the reproduced data in the memory 22 at the transfer rate of 75 sectors/second, the read pointer R of the memory 22 is continuously incremented at a transfer rate of 18.75 sectors/second to continuously read out the playback data from memory 22 at the transfer rate of 18.75 sectors/second, and the write pointer W of the memory 22 is intermittently incremented at the transfer rate of 75 sectors/second, so that, when the write pointer W catches up with the read pointer R, writing is discontinued. When the data volume of the playback data stored in the memory 22 is lower than the predetermined volume L, writing is started again.

Thus, with the above described reproducing system of the disc recording/reproducing apparatus, the system controller 7 controls the memory 22 in such a manner that the B-level stereo mode ADPCM audio data reproduced from the recording track of the magneto-optical disc 2 is written in a burst fashion in the memory 22 at a transfer rate of 75 sectors/second, and read out continuously from the memory 22 as playback data at the transfer rate of 18.75 sectors/second, so that the playback data may be continuously read out from the memory 22 while the data readout region in excess of the predetermined volume L is perpetually maintained within memory 22. Also the playback data intermittently written in the memory 22 may be continuously reproduced from the recording track on the magneto-optical disc 2 by controlling the reproducing position on the recording track of the magneto-optical disc 2 by the system controller 7. In addition, the data read-out region in excess of the predetermined volume L is perpetually maintained in the memory 22, as described previously, so that, even when the system controller 7 should detect the occurrence of a track jump etc. due to, for example, disturbances, and the operation of reproducing the magneto-optical disc 2 is discontinued, the playback data may be read out from the data read-out region having a space in excess of the predetermined data volume to continue the outputting of the analog audio signals, while the resetting operation may be executed in the interim.

It is to be noted that the present invention is not limited to the above described embodiment. For example, although the above disc recording/reproducing apparatus has been explained in connection with recording and/or reproduction of the B level stereo mode ADPCM audio data, recording and/or reproduction may be performed similarly of the ADPCM audio data of other modes of other CD-I systems. The method of data compression is also not limited to ADPCM. The number of sectors constituting a cluster is not limited to 32, but a cluster may be composed of any other number of sectors, such as 64 sectors.

What is claimed is:

1. A disc reproducing apparatus for reproducing record data continuously recorded on a disc-shaped recording medium, said apparatus comprising:

reproducing means for reproducing record data comprising time compressed, interleaved digital data clusters and cluster-linking sectors, where each of the cluster-linking sectors is concatenated between two of the clusters, wherein each of the cluster-linking sectors has a duration longer than an interleaving period, wherein the digital data in each of the clusters are interleaved in accordance with said interleaving period, decoding means for receiving reproduced data from the reproducing means and generating decoded digital data from which said cluster-linking sectors have been removed, storage means, connected to the decoding means, for storing intermittently received bursts of the decoded digital data from which said cluster-linking sectors have been removed, time expanding means for reading deinterleaved, decoded digital data from said storage means and processing said deinterleaved, decoded digital data read from the storage means to generate time-expanded output signals, and control means for effecting writing control on said storage means, including means for generating a control signal on determining that an amount of said decoded digital data stored in said storage means is lower than a predetermined amount of data, and supplying said control signal to the reproducing means to cause the reproducing means to reproduce a further amount of said record data for processing in the decoding means and storage in said storage means to increase the amount of decoded data in the storage means to an amount not less than said predetermined amount of data.

2. The disc reproducing apparatus of claim 1 wherein said control means includes means for detecting that said reproducing means is in an unreproducible state, and for terminating writing of the decoded data into said storage means and resetting said reproducing means to a reproducible state upon determining that the reproducing means is in the unreproducible state.

3. The disc reproducing apparatus of claim 2 wherein said predetermined amount of data is in excess of an amount of digital data read by the time expanding means from said storage means during said resetting of the reproducing means from the unreproducible state to the reproducible state.

* * * * *